United States Patent [19]

Whitemore et al.

[11] 4,300,978
[45] Nov. 17, 1981

[54] BONDING TOOL FOR VENTING HONEYCOMB NOISE ATTENUATION STRUCTURE DURING MANUFACTURE

[75] Inventors: Christopher E. Whitemore, Riverside; Robert M. Carrillo, San Bernardino, both of Calif.

[73] Assignee: Rohr Industries, Inc., Chula Vista, Calif.

[21] Appl. No.: 112,645

[22] Filed: Jan. 16, 1980

Related U.S. Application Data

[62] Division of Ser. No. 55,681, Jul. 6, 1979.

[51] Int. Cl.³ .......................... B32B 31/20; B32B 3/12
[52] U.S. Cl. ..................................... 156/581; 100/297; 156/87; 156/197; 156/292; 156/548; 181/288; 181/292; 181/294; 181/296; 425/812; 428/73; 428/116; 428/118; 428/137
[58] Field of Search ....................... 29/33 G, 157.3 D; 100/110, 297; 156/197, 548, 581, 87, 291, 292; 181/284, 288, 292, 293, 294, 296; 228/106, 181; 428/73, 116, 117, 118, 137; 425/812; 34/143, 145

[56] References Cited

U.S. PATENT DOCUMENTS

| 2,983,638 | 5/1961 | Quehl | 156/581 |
|---|---|---|---|
| 3,128,544 | 4/1964 | Allingham | 228/181 X |
| 3,166,149 | 1/1965 | Hulse et al. | 428/118 X |
| 4,017,980 | 4/1977 | Kleinguenther | 34/143 X |
| 4,217,157 | 8/1980 | Stoltze et al. | 156/87 |
| 4,254,171 | 3/1981 | Beggs et al. | 428/116 |
| 4,269,882 | 5/1981 | Carrillo et al. | 428/116 |

Primary Examiner—Robert A. Dawson
Attorney, Agent, or Firm—Patrick J. Schlesinger; Frank D. Gilliam

[57] ABSTRACT

Method of making attenuation sandwich panels having a cellular core positioned between and bonded to an imperforate facing sheet on one surface thereof and a perforate sheet with an outer layer of porous fabric material adhered to the other surface. The combined perforate facing sheet and porous fibrous material have a predetermined open surface area prior to its adherence to the cellular core. A coating of adhesive is applied to either the facing sheets or to the faying surface of the cellular core. The sheets are then properly positioned with respect to the cellular core. The porous fabric surface of the combined perforate sheet and porous fibrous material is positioned against a perforated plate. The opposite surface of the perforated plate is positioned against a bonding tool that has a plurality of longitudinal grooves on its perforated plate adjacent surface. This combination is then placed in a press or the like where pressure is applied from the facing sheets towards the core and is then heated until the adhesive is cured.

3 Claims, 4 Drawing Figures

BONDING TOOL FOR VENTING HONEYCOMB NOISE ATTENUATION STRUCTURE DURING MANUFACTURE

This is a division of application Ser. No. 055,681, filed July 6, 1979.

BACKGROUND OF THE INVENTION

This invention relates to a method of manufacturing new and improved noise attenuating panels and more particularly to a honeycomb panel having an imperforate sheet on one surface and a perforate facing sheet with a layer of porous material bonded thereto wherein there is continuous communication between the core cells and the atmosphere adjacent to the noise to be attenuated. The material is specifically suitable for use in a severe environment such as within an aircraft engine.

In manufacturing sound suppressive metal honeycomb sandwich panels which are exposed to extreme environment and the sound produced by modern turbine aircraft engines, it is common practice to provide a cellular structure utilizing the Helmholtz resonance principle wherein a first imperforate sheet of material is bonded to one core surface of a sheet of cellular core material and a thin perforated sheet of like material is applied to opposite core surface.

Panels of this type construction, although satisfactory for some sound frequencies are found to be an inefficient noise attenuator over a broad range of frequencies customarily encountered in and around aircraft jet engines. Additionally it has been found that the perforations of the perforated sheet exposed directly to gas flow within the engine or outer aircraft surfaces create turbulence to high speed flow as, for example, within the throat of a fan type jet engine or along exterior aircraft structure during normal flight conditions.

Other concepts have included interposing a sheet of fibrous material between the perforated sheet and the core. This has proven to be unsound structurally in severe engine environments.

Attempts to successfully manufacture this and various other sound suppression material of this general type have resulted in the adhesive used for bonding of the various components to the core to ooze or wick into the perforations and at least partially fill those perforations, changing the flow resistance between the atmosphere where the sound is produced and the core cells. When the perforations are made large enough to accommodate the excess adhesive, the structural strength is reduced and the air flow turbulence is increased. In those structures where the porous fibrous material is inserted between the cellular core and the outer perforate sheet, the adhesive wicks into the pores of the porous fibrous material as well as into the perforations, thus further reducing the effectiveness of the resulting structure.

SUMMARY OF THE INVENTION

It is the primary objective of this invention to produce a sound absorption material wherein the perforations as well as the pores of the porous sheet material are substantially free of bonding adhesives.

Another objective of this invention is to provide tools to be utilized in the bonding of sound absorbing material that allows the internal core pressures to remain at substantially atmospheric pressure while the bonding medium is being cured.

Still another objective of this invention is to provide a method of manufacturing sound absorption material wherein the openings between the outer surface of the sound absorption material and the core have a predetermined flow resistance.

These and other objectives and advantages of the invention will become better understood by reference to the following detailed description when considered together with the accompanying drawings, in which:

DETAILED DESCRIPTION OF THE PREFERRED EMBODIMENT OF THE INVENTION

Figure 1:
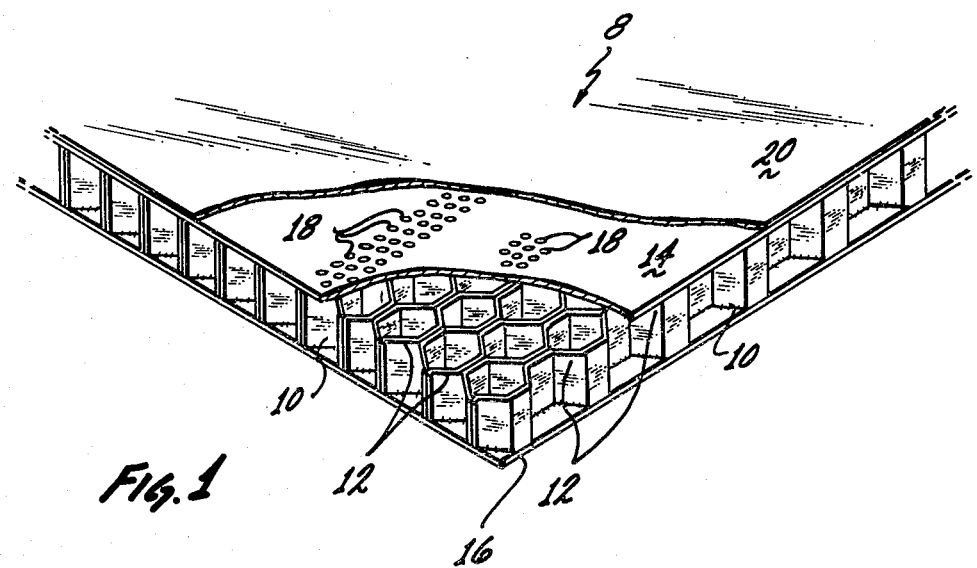
FIG. 1 is a perspective view of the acoustical panel constructed by the method of the instant invention.
Figure 2:
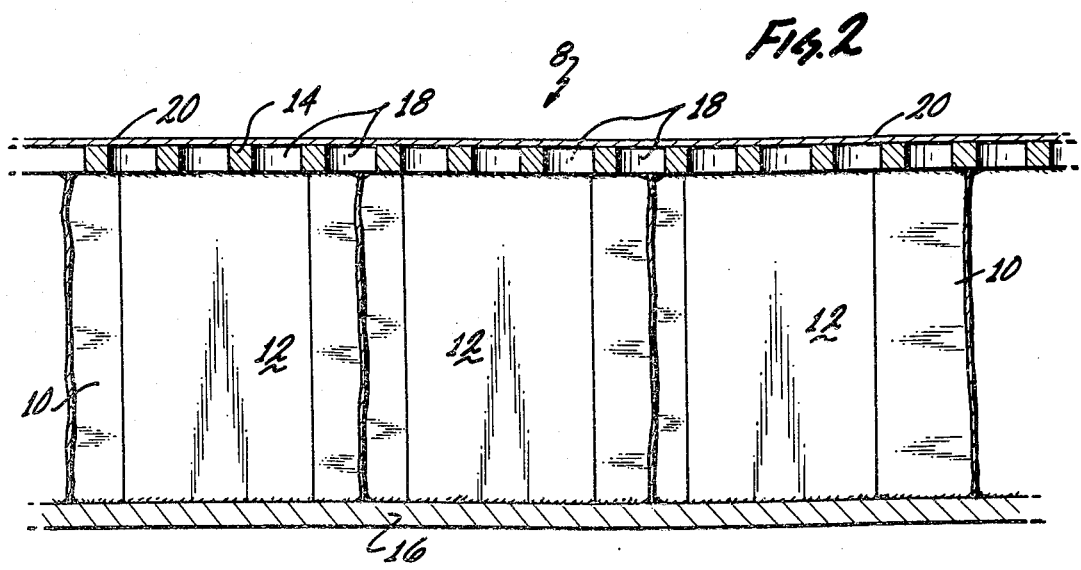
FIG. 2 is a fragmentary vertical section of the panel of FIG. 1.

Referring now to the drawings in detail, the acoustic sandwich structure 8 comprises a single honeycomb core 10 having a usual multiplicity of end wise directed cells 12 therein, a thin imperforate facing sheet 13, a perforated facing sheet 14 having a multiplicity of perforations 18 of preselected cross sectional area, and a thin sheet of porous material 20 which may be metallic fibrous felt or any of a number of various other fibrous materials including stainless steel, graphite, nylon or the like. For some specific applications a woven material with its fiber cross over points joined by diffusion bonding or left unjoined may be employed equally as well to practice the invention.

It has been found that even by properly selecting the viscosity index of the adhesives used in the bonding of the various components of acoustical panels and undesirable amount of the adhesive wicks into the perforations of the facing sheet 18 by capillary attraction.

It has been found that since the adhesive used in the bonding is cured generally by an elevated temperature in the range of 300° to 400° F. that expansion of the air or gas trapped within the cells 12 occurs forcing the adhesive from around the perforations 18 into the perforations when sufficient elevated pressures are reached within the various cells.

Figure 3:
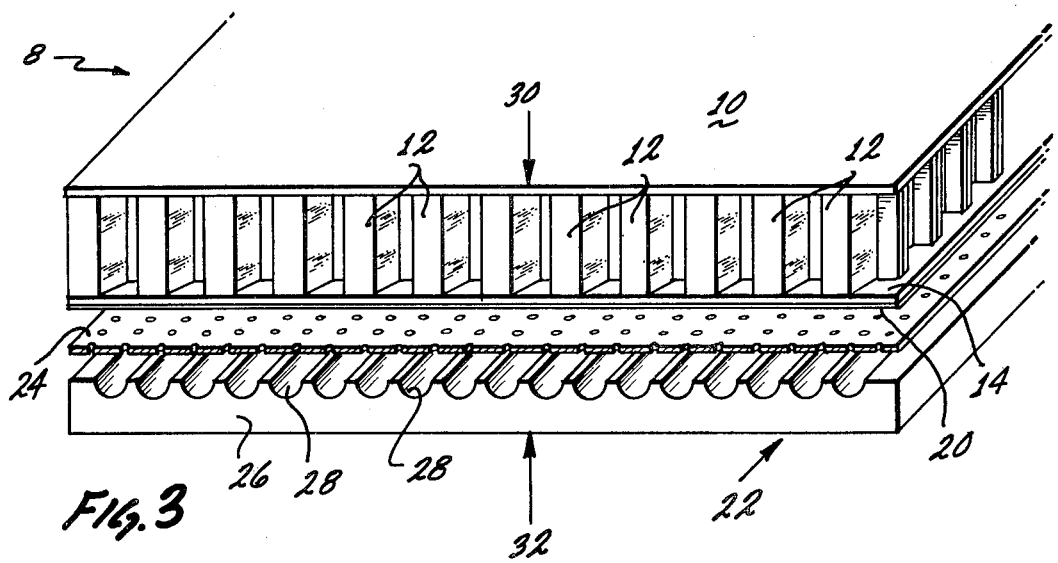
FIG. 3 is a perspective view of the various components of the acoustic panel of FIG. 1 and the perforated plate and groove bonding tool in their relative positions with relation thereto.
Figure 4:
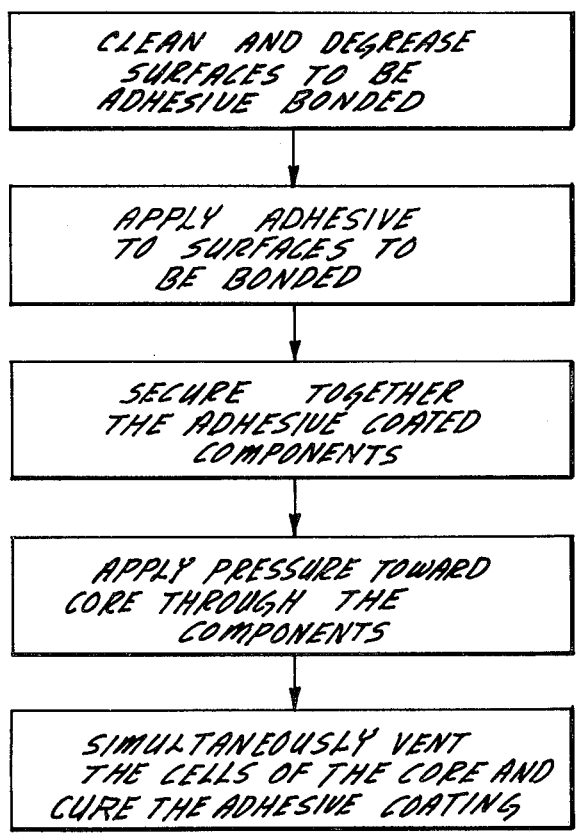
FIG. 4 is a flow diagram of the steps of the method of manufacture.

Now referring specifically to FIG. 3, to prevent any pressure build up within the cells 12 a two piece tool 22 is utilized in the manufacturing process of the acoustic sandwich material. The tool 22 consists of a perforated plate 24 and a bond tool 26 which has a plurality of juxtaposed grooves 28 extending the length of the bond tool which is at least as long and as wide as the product being assembled. A combination of the perforations 30 of plate 24 and the grooves 28 of the bond tool 26 provide for sufficient venting so that the pressure within the cell is maintained at substantially atmospheric pressure due to the constant venting of the cells through perforations 30 and grooves 28.

The manufacturing process includes preparing the various components to be adhesively bonded together to insure that they are free of any surfactants that would prevent a satisfactory bonding. Various cleaning methods are well known in the art and, therefore, are not considered a part of the instant invention. The properly cleaned and degreased components are then ready for assembly.

A layer of adhesive is then applied either to the edges of the faying surface of the core cells 12 or to one surface of the imperforate facing sheet 10 and to the perforate facing sheet 14, on the surface opposite the porous material 20.

The perforate facing sheet 14 and the porous material 20 have been previously joined by a separate process, not being claimed in the instant invention, prior to the assembly of the acoustic sandwich 8 so that a predetermined flow resistance is achieved through the combined perforate facing sheet 14 and porous fibrous material 20.

The adhesive coated components are then stacked as shown in FIG. 3 with the perforate plate 24 positioned between the groove bond tool 26 and the layer of porous fibrous material 20. Pressure is then applied to the perforate sheet and the bonding tool along arrows 30, 32 of a sufficient degree to properly hold the components together for the curing of the adhesive generally around 50 psi. This pressure may be achieved by any one of many means, such as, but not limited to, a press, an autoclave system or the like. After or during suitable pressure application, the temperature of the components is then elevated to a desired level to timely cure the adhesive. The temperature is then reduced to ambient and either simultaneously or after at least a partial reduction of the elevated temperature, the pressure along arrows 30, 32 is released.

Under the appropriate circumstances, either the perforate sheet 24 or the groove bonding tool 26 may not be required in the bonding process to obtain satisfactory results.

Although the foregoing invention has been described in some detail by way of illustration and example for purposes of clarity of understanding, it should be understood that certain changes and modifications may be practiced within the spirit of the invention as limited only by the scope of the appended claims.

What is claimed as new and useful and desired to be secured by United States Letters Patent is:

1. A bonding tool for holding together in proper positioned relationship a central cellular core sandwiched between an imperforate and a perforate sheet, said perforate sheet having an outer exposed layer of porous fibrous material bonded thereto, while being bonded together by coatings of adhesive positioned between said central cellular core and said imperforate and perforate sheets comprising;
    a bond tool at least as large as the sandwiched components, said bond tool having a grooved surface, the grooves extending along the entire length of one dimension of said bond tool, and a perforated plate positioned between said porous fibrous material and said bond tool for allowing the cells of said central cellular core to vent to the atmosphere through the perforate sheet and porous fibrous material combination while pressure is being applied toward the center of said sandwiched components through said perforated plate and said imperforate sheet during the cure of said adhesive coatings.

2. The invention as defined in claim 1 wherein said grooves are parallel and curvilinear.

3. The invention as defined in claim 1 wherein said grooves are semi-circular in cross-section.

* * * * *